Jan. 15, 1957 T. B. ORTWIG Re. 24,266

ELECTRICAL SWITCHES

Original Filed May 28, 1953 3 Sheets-Sheet 1

INVENTOR.

THOMAS B. ORTWIG

BY Ewin Harrington,

ATTORNEY

ELECTRICAL SWITCHES

Original Filed May 28, 1953 3 Sheets-Sheet 2

INVENTOR.

THOMAS B. ORTWIG

BY

E. M. Harrington.

ATTORNEY

ELECTRICAL SWITCHES

Original Filed May 28, 1953 3 Sheets-Sheet 3

INVENTOR.
THOMAS B. ORTWIG
BY
Ernest Harrington,
ATTORNEY

United States Patent Office

Re. 24,266
Reissued Jan. 15, 1957

24,266

ELECTRICAL SWITCHES

Thomas B. Ortwig, Florrisant, Mo., assignor to James R. Kearney Corporation, St. Louis, Mo., a corporation of Missouri Original No. 2,707,732, dated May 3, 1955, Serial No. 358,055, May 28, 1953. Application for reissue April 30, 1956, Serial No. 581,816

9 Claims. (Cl. 200—48)

Matter enclosed in heavy brackets [ ] appears in the original patent but forms no part of this reissue specification; matter printed in italics indicates the additions made by reissue.

This invention relates generally to electrical switches and more specifically to electrical switches of the side-opening type, the predominant object of the invention being to provide an electrical switch of the type mentioned which is intended for use as a unit of a gang switch structure and which, because of its improved construction and arrangement, is capable of performing its function in an improved and highly efficient manner.

Figure 1:
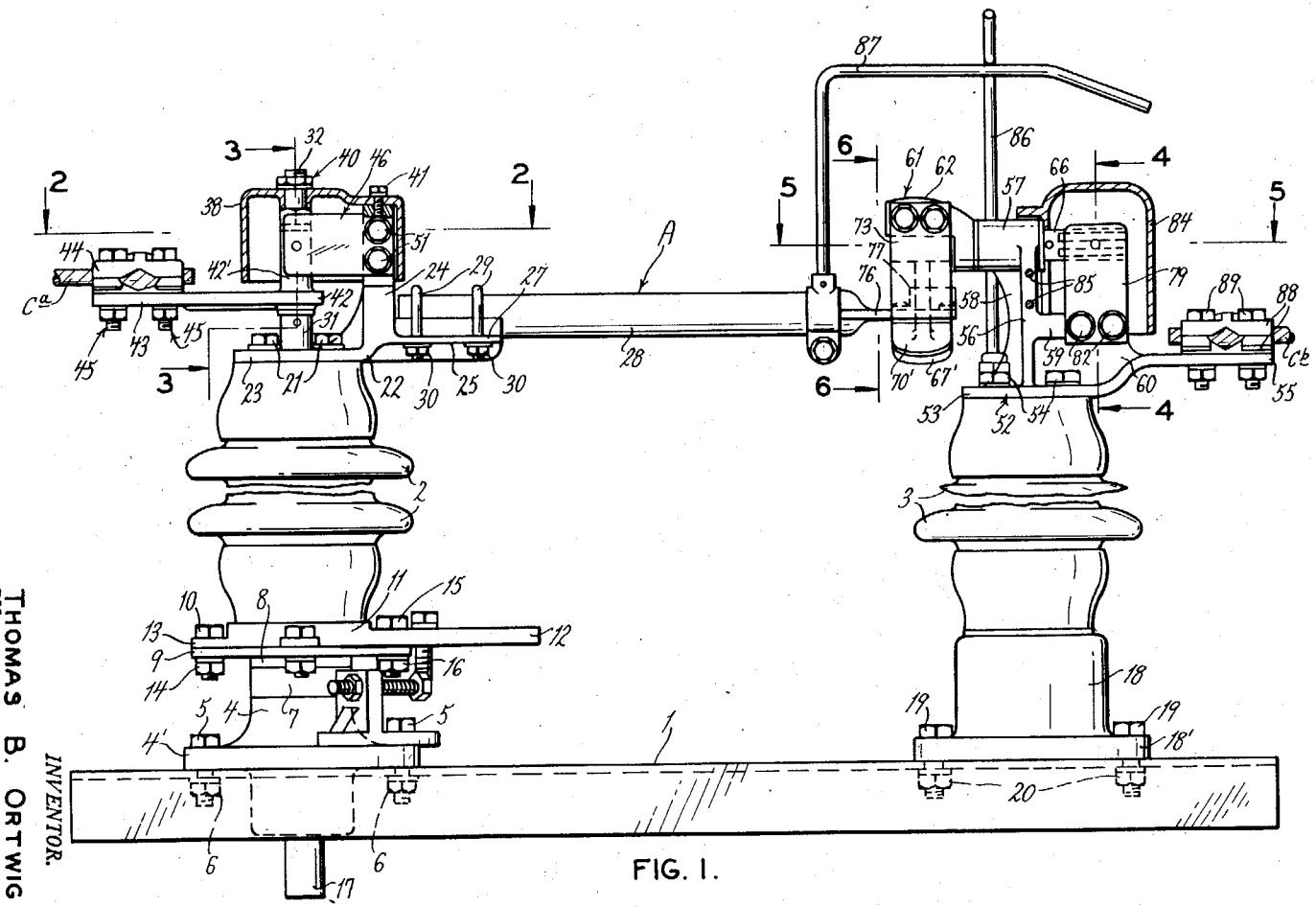
Fig. 1 is a side elevation of an electrical switch constructed and arranged in accordance with this invention, with portions of the insulators broken away.

In the drawings, wherein is shown for purposes of illustration, merely, one embodiment of the invention, A designates in Fig. 1 the improved electrical switch generally. The switch A includes a base member 1 which preferably, though not necessarily, is in the form of a channel beam, said base member having a pair of vertically disposed insulators 2 and 3 mounted thereon, the insulator 2 being supported for rotary movement about its major axis, while the insulator 3 is supported in a stationary manner. The insulator 2 is supported with respect to the base member by means of a bracket member 4 which is secured by bolts 5 to the base member 1, the shanks of said bolts being extended through openings formed through the annular flange 4' of said bracket member 4 and through openings formed through top wall of said base member, there being nuts 6 applied to the lower portions of the bolt shanks in contact with the lower face of the top wall of the base member 1. Contacting with the top face of the bracket member 4 is a spacer 7 with which top face the bottom face of a member 8 contacts, said member being provided with an annular flange 9. Bolted to the annular flange 9 of the member 8 by means of bolts 10 is an element 11 which includes an arm 12, the element 11 being provided with outstanding lugs 13, and the shanks of certain of the bolts 10 extend through apertures formed through said lugs and through the annular flange 9 of the element 11 with nuts 14 applied to the lower portions of said bolt shanks in contact with the lower face of the annular flange 9 of the member 8. In addition to the bolts 10 just referred to herein, a bolt 15 serves to aid in the attachment of the element 11 to the member 8, the shank of said bolt 15 passing through alined apertures formed through the arm 12 and the annular flange 9 of the member 8 with a nut 16 applied to the lower end portion of said bolt shank in contact with the lower face of the annular flange of the member 8. The insulator 2 is suitably fixed to the element 11 and an operating rod 17 is fixed to the member 8, said rod having means (not shown) at its lower end which facilitates axial rotation of said rod with a consequent axial rotation of the insulator 2.

As stated above, the insulator 3 is supported by the base member 1 in a stationary manner, there being a bracket member 18 having an annular flange 18' which is fixedly secured to said base member 1 by bolts 19, whose shank portions extend through alined apertures formed through the flange 18' of said bracket member 18 and through the top face of the base member 1. The shank portions of the bolts 19 have nuts 20 applied thereto which contact with the lower face of the top wall of the base member 1, and the insulator 3 is suitably secured to the bracket member 18.

Figure 3:
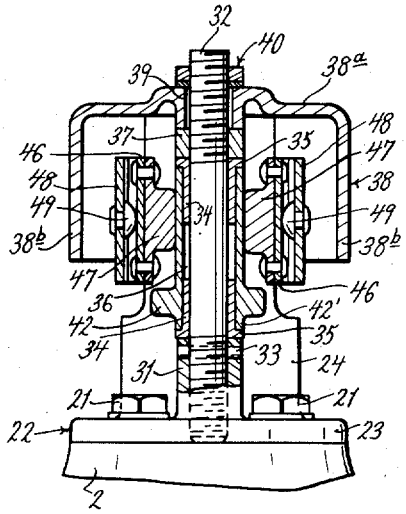
Fig. 3 is an enlarged, fragmentary, vertical section taken on the staggered line 3—3 of Fig. 1.
Figure 4:
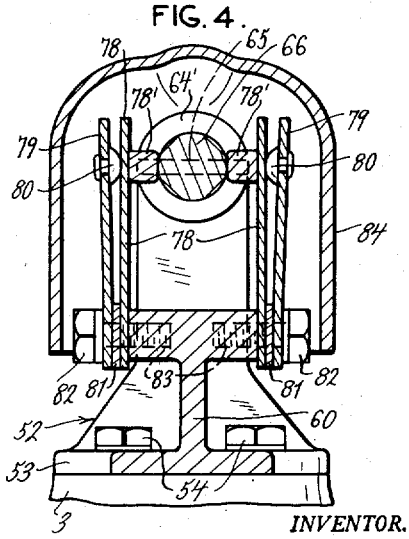
Fig. 4 is an enlarged, fragmentary, vertical section taken on line 4—4 of Fig. 1.

Secured to the top face of the insulator 2 by means of bolts 21 is a blade holder 22, said blade holder having a circular plate portion 23 which is secured to the top portion of the insulator 2 by the previously mentioned bolts 21. Extended at an approximate right angle relative to the plate portion 23 is a vertically disposed portion 24 and projected from the lower portion of said vertical portion 24 is a horizontal portion 25. The horizontal portion 25 is provided with an arcuate recess 26 and flanges 27 extended outwardly from the portion in which said recess is formed. Also, a portion of a blade 28 is seated in said arcuate recess with a pair of U-bolts 29 arranged in partial embracing relation with respect to said blade portion, the legs of said U-bolts being extended through apertures formed through said flanges 27 and having nuts 30 mounted thereon which engage said flanges. The plate portion 23 of the blade holder has formed thereon a tubular extension 31 which extends upwardly therefrom, said tubular extension being internally screw-threaded and receiving the lower screwthreaded portion of a vertically disposed spindle 32 (Fig. 3), there being a pin 33 extended through apertures formed in opposed wall portions of said tubular extension 31 and through said spindle to prevent rotation of said spindle. Embracing said spindle is a bearing sleeve 34 which is provided with annular flanges 35 at the opposite end thereof and is provided with openings 36 formed in the wall thereof, the bottom flange 35 of said sleeve contacting with the top face of the tubular extension 31, while the top flange of said sleeve is engaged by a nut 37 which is screwed on the upper screwthreaded portion of the spindle 32. A hood 38 having a top wall 38a and depending, marginal wall portions 38b has formed in its top wall a flanged opening 39 through which the upper portion of the spindle 32 extends, the flange of said opening 39 extending downwardly and contacting at its lower end with said nut 37. A nut and washer assembly 40 is applied to the upper portion of the spindle 32 in engagement with the top wall of the hood 38, and a bolt 41 is extended through an aperture formed through the top wall of the hood at the forward portion of said hood and is screwthreadedly projected into the top of the vertical portion 24 of the blade holder 22.

Figure 2:
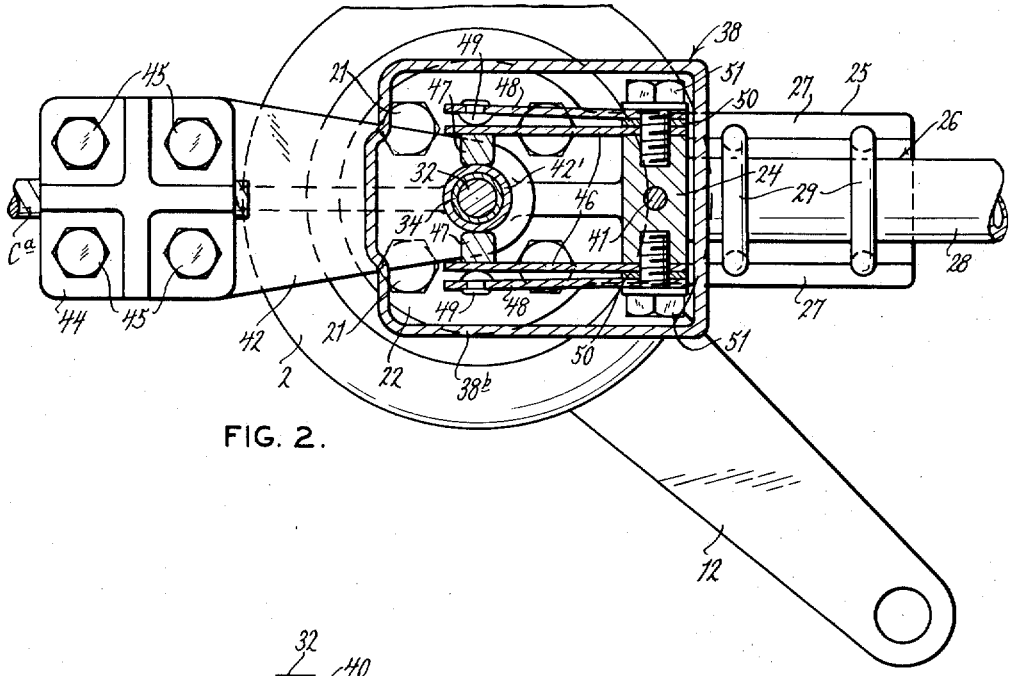
Fig. 2 is an enlarged horizontal section taken on line 2—2 of Fig. 1.

Arranged in embracing relation with respect to the bearing sleeve 36 is the hub portion 42' of a terminal bar 42, said hub portion being capable of rotating about the bearing sleeve 36 to a limited degree and contacting at its opposite ends with the annular flanges 35 of said bearing sleeve 36. The terminal bar 42 has mounted on the outer end portion thereof a pair of conductor clamping plates 43 and 44, said clamping plates having an end portion of an incoming conductor Ca clamped therebetween, the clamping plates being secured to the terminal bar, and being drawn together to clamp the conductor, by a plurality of bolt and nut assemblies 45. Secured to opposite sides of the vertically disposed portion 24 of the blade holder 22 is a pair of resilient contacts 46 which are provided with inwardly projected extensions 47, these extensions being riveted, or otherwise secured, to the contacts 46 as is shown to good advantage in Fig. 3. The inner faces of the extensions are forced by the resiliency of the contacts 46 into close contact with the circumferential face of the hub portion 42' of the terminal bar 42. Also each contact has related to it a resilient element 48 which is provided with a rivet 49 extended therethrough the head of which contacts with the contact 46, as is shown to good advantage in Fig. 2, so as to apply pressure to the related contact. The forward end portions of each pair of the related contacts 46 and 48 have a spacer 50 located therebetween, and bolts 51 are extended through alined apertures formed in said forward end portions of said contacts and in the spacers, the screwthreaded shanks of said bolts being extended screwthreadedly into openings formed in the vertical portion 24 of the blade holder 22 for securing said contacts in place.

Figure 5:
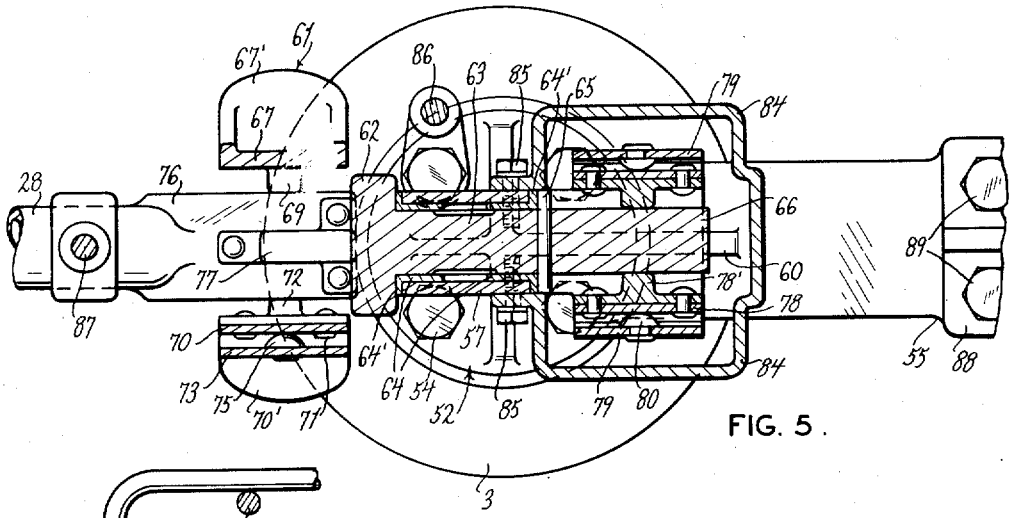
Fig. 5 is an enlarged, fragmentary, horizontal section taken on line 5—5 of Fig. 1.

Fixedly mounted atop the insulator 3 is a contact and bearing support 52, said support having a circular plate portion 53 which is secured to said insulator 3 by means of bolts 54, and extended forwardly from the plate portion 53 is a terminal portion 55 which is elevated slightly with respect to the plate portion, as is shown to good advantage in Fig. 1. The contact and bearing support 52 includes a vertical disposed portion 56 which is formed integral with and extends upwardly from the plate portion 53, and located at the upper end of this vertical portion is a bearing structure 57, there being an integral web 58 related to said plate portion 53, vertical portion 56, and bearing to impart strength to the structure. Also, a horizontal portion 59 is extended forwardly from the vertical portion of the contact and bearing support 52, a vertical web 60 being arranged beneath said horizontal portion to give strength thereto. Supported by the bearing structure is a swinging contact member 61 which comprises a head portion 62 of substantially L-shaped formation, there being a shaft 63 extended forwardly of the switch from the head portion 62 of the swinging contact member 61. This shaft 63 extends through and beyond the bearing structure 57, there being a bearing sleeve 64 disposed within the bearing structure through which said shaft passes and said bearing sleeve is provided with annular flanges 64' at its opposite ends which contact with the end faces of the bearing structure 57, as is shown in Fig. 5. The shaft 63 has an opening formed therethrough through which is extended a pin 65 whose opposite end portions extend beyond the peripheral face of said shaft, said extended end portions of said pin contacting with the forward end of the bearing sleeve 64 to prevent rearward movement of the shaft 63 relative to the bearing structure 57. The portion 66 of the shaft 63 which is extended beyond the bearing structure is provided with a plurality of flattened portions 66' which serve a function to be hereinafter set forth.

The head portion 62 of the swinging contact 61 has secured thereto at one side thereof a leg 67, said leg having an outwardly flared portion 67' at its lower end and being secured by means of bolts 68, located adjacent to its upper end, to said head portion 62. The leg 67 is provided at its inner face with a rib 69 that is secured thereto and extends longitudinally thereof (Figs. 6 and 7) and serves a function to be hereinafter set forth. At the opposite side of the head portion 62 a resilient leg 70 is secured thereto, said leg 70 having a lower portion 70' secured thereto by means of suitable fastening devices 71. Also, the lower portion 70' has secured thereto at its inner face a rib 72 which extends longitudinally of a portion thereof. An auxiliary resilient leg 73 is arranged substantially parallel with respect to the leg 70, there being a spacer between the upper end portions of said legs 70 and 73 with the shank of bolts extended through alined openings formed through said upper leg portions and said spacer and screwed into screwthreaded openings 74 formed in said head portion 62 of said swinging contact 61 for securing said legs 70 and 73 in place relative to said head portion. The auxiliary leg 73 has mounted thereon a rivet 75 whose head contacts with the leg 70.

The blade 28 of the switch A for the greater portion of its length is of tubular formation with the extreme, forward portion of said blade flattened to provide a blade portion 76 which is disposed in a horizontal position. Fixed to this flat, forward portion of the blade is a flanged rib 77 which is riveted, or otherwise secured, to said blade portion. Secured to the horizontal portion 59 of the contact and bearing support 52 at opposite sides thereof is a pair of resilient contacts 78 which have secured thereto at points adjacent to the upper ends thereof inwardly projected extensions 78', the inner faces of said extension 78' contacting with the circumferential face of the forward end portion 66 of the shaft 63 of the swinging contact 61 at diametrically opposed sides thereof. Related to each contact 78 is a resilient element 79 which is provided with a rivet 80 mounted thereon whose head contacts with the related contact 78 to apply pressure thereto, and interposed between the lower portions of each related pair of contacts 78 and 79 is a spacer 81, said lower portions of each related pair of contacts 78 and 79 and the spacer 81 located therebetween being provided with alined apertures through which the shanks of bolts 82 are passed, said bolt shanks being screwed into screwthreaded openings 83 formed in the portion 59 of the contact and bearing support 52. The projected portion 66 of the shaft 63 and the contacts 78 and 79 are covered by a hood 84, said hood having a rearwardly extended flange through which bolts 85 are extended for securing said hood in place. Also, an arcing horn 86 is supported by the portion 53 of the support 52 and extends upwardly therefrom, while a companion arcing horn 87 is suitably mounted on the switch blade 28 in such position that it will engage said arcing horn 86 for operation in an obvious manner.

Figure 6:
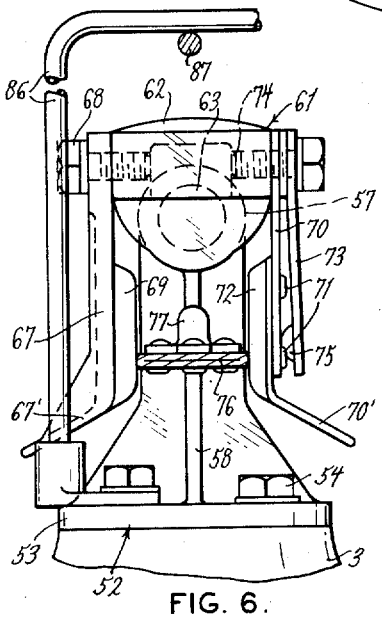
Fig. 6 is an enlarged, fragmentary, vertical section taken on line 6—6 of Fig. 1.

In the use of the switch of this invention the swinging contact member 61, in the closed switch position of the switch, assumes the position in which it is shown in Fig. 6, with the flat, forward portion 76 of the blade 28 extended between the downwardly extended legs 67 and 70 of said swinging contact. At this time it will be pointed out that the leg 67 is a contact whose rib 69 contacts with a side edge of the blade portion 76, and that the leg 70 is likewise a contact, the rib 72 of the lower portion 70' of said leg 70 contacting with the opposite side edge of the forward portion 76 of the blade 28. Also, the leg 73 functions as a leaf spring, the head of the rivet 75 of said leg 73 contacting with said lower leg portion 70' of the leg 70 in a manner to apply such pressure to the leg 70 as to provide high pressure contact between the contacts 67 and 70 and the opposite side edges of the blade portion 76. The electrical path through the switch A is from the incoming conductor Ca to the terminal arm 42, from said terminal arm 42 through the contacts 46 to the blade-holder 22 and blade, from said blade-holder through the contacts 67 and 70 of the swinging contact member, and through the contacts 78 to the terminal portion 55 of the contact and bearing support 52 to which an outgoing conductor Cb is connected by a pair of clamping plates 88 which are drawn toward each other and are secured to said terminal portion 55 by bolts 89.

Figure 7:
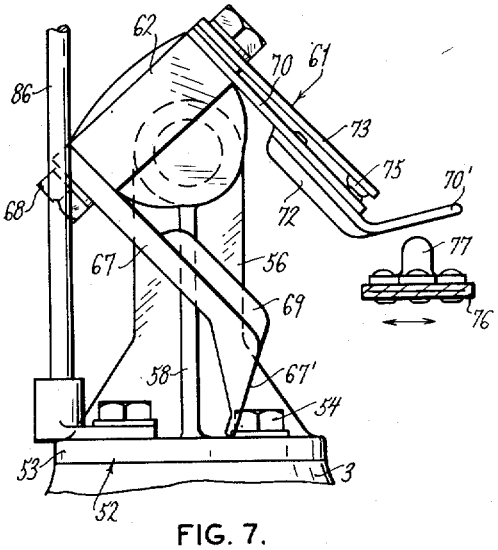
Fig. 7 is a view similar to Fig. 6, but showing parts of the switch in changed positions.
Figure 8:
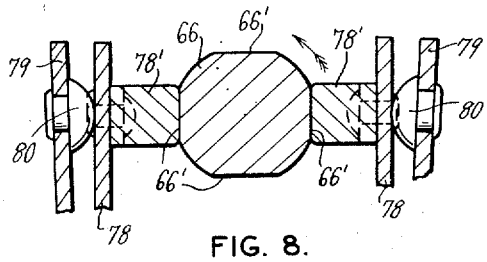
Fig. 8 is a sectional detail illustrating the contact arrangement at one end of the switch.

To move the switch A to the open-switch position the rotatable insulator 2 is rotated in a direction which will move the switch blade 28, which is fixed to said rotatable insulator, horizontally from the position in which it is shown in Fig. 6 to the position in which said switch blade is shown in Fig. 7. During such movement of the switch blade the flat, forward portion thereof, being in contact with the leg 70 of the swinging contact member 61, will move said swinging contact member from the position in which it is shown in Fig. 6 to the position in which said swinging contact member is shown in Fig. 7. Likewise, when the switch A is to be moved to the closed-switch position the rotatable insulator is rotated in the reverse direction and the flat, forward portion of the switch blade contacting with the leg 67 of the swinging contact member moves said swinging contact member from the position in which it is shown in Fig. 7 to the position in which it is shown in Fig. 6. It is to be noted that coaction between the rib on the inner face of the leg 70 of the swinging contact member 61 and the projection [76'] *77* secured to the forward portion 76 of the switch blade 28 causes said leg 70 and said forward blade portion to clear each other so that there is no opportunity for interference between said parts on opening movement of the switch blade of the switch.

I claim:

1. A side break electrical switch comprising a base member, an insulator structure supported by said base member for rotary movement, a switch blade supported by said rotary insulator structure for movement therewith in a horizontal plane, a second insulator structure fixedly supported by said base member, and a contact structure supported by said fixed insulator structure, said contact structure including spaced contact elements, a shaft, a bearing for supporting said shaft horizontally for oscillatory movement, means for electrically connecting an incoming electrical conductor to said switch blade, and means for electrically connecting an outgoing electrical conductor to said spaced contact elements, said spaced contact elements receiving therebetween and in electrical contact therewith a portion of said switch blade.

2. A side break electrical switch comprising a base member, an insulator structure supported by said base member for rotary movement, a switch blade supported by said rotary insulator structure for movement therewith in a horizontal plane, a second insulator structure fixedly supported by said base member, and a contact structure supported by said fixed insulator structure, said contact structure including a head, spaced contact elements extended from said head, a shaft extended from said head, a bearing for supporting said shaft in a horizontal position for oscillatory movement, means for electrically connecting an incoming electrical conductor to said switch blade, and means for electrically connecting an outgoing electrical conductor to said contact structure, said spaced contact elements receiving therebetween and in electrical contact therewith a portion of said switch blade.

[3. A side break electrical switch comprising a base member, an insulator structure supported by said base member for rotary movement, a switch blade supported by said rotary insulator structure for movement therewith in a horizontal plane, a second insulator structure fixedly supported by said base member, and a contact structure supported by said fixed insulator structure, said contact structure including a head, spaced contact elements extended from said head, a shaft extended from said head, a bearing for supporting said shaft in a horizontal position for oscillatory movement, means for electrically connecting an incoming electrical conductor to said switch blade, and means for electrically connecting an outgoing electrical conductor to said contact structure, said spaced contact elements receiving therebetween and in electrical contact therewith a portion of said switch blade and each of said spaced contact elements being provided by a pair of plates one of which is provided with a projection which contacts with the other of said pair of plates.]

[4. A side break electrical switch comprising a base member, an insulator structure supported by said base member for rotary movement, a switch blade supported by said rotary insulator structure for movement therewith in a horizontal plane, a second insulator structure fixedly supported by said base member, and a contact structure supported by said fixed insulator structure, said contact structure including a head, spaced contact elements extended from said head, a shaft extended from said head, a bearing for supporting said shaft in a horizontal position for oscillatory movement, means for electrically connecting an incoming electrical conductor to said switch blade, and means for electrically connecting an outgoing electrical conductor to said contact structure, said spaced contact elements receiving therebetween and in electrical contact therewith a portion of said switch blade and each of said spaced contact elements being provided by a pair of resilient plates one of which is provided with a projection which contacts with the other of said pair of plates.]

5. A side break electrical switch comprising a base member, an insulator structure supported by said base member for rotary movement, a switch blade supported by said rotary insulator structure for movement therewith in a horizontal plane, a second insulator structure fixedly supported by said base member, a contact structure supported by said fixed insulator structure, said contact structure including a head, spaced contact elements extended from said head, a shaft extended from said head, a bearing for supporting said shaft in a horizontal position for oscillatory movement, spaced contact elements electrically contacting with a portion of said shaft, means for electrically connecting an incoming electrical conductor to said switch blade, and means for electrically connecting an outgoing electrical conductor to the spaced contact elements which contact with said shaft, said spaced contact elements which extend from said head receiving therebetween and in contact therewith a portion of said switch blade.

[6. A side break electrical switch comprising a base member, an insulator structure supported by said base member for rotary movement, a switch blade supported by said rotary insulator structure for movement therewith in a horizontal plane, a second insulator structure fixedly supported by said base member, a contact structure supported by said fixed insulator structure, said contact structure including a head, spaced contact elements extended from said head, a shaft extended from said head, a bearing for supporting said shaft in a horizontal position for oscillatory movement, spaced contact elements electrically contacting with a portion of said shaft, each of said spaced contact elements being comprised of a pair of plates, means for electrically connecting an incoming electrical conductor to said switch blade, and means for electrically connecting an outgoing electrical conductor to the spaced contact elements which contact with said shaft, said spaced contact elements which extend from said head receiving therebetween and in contact therewith a portion of said switch blade.]

[7. A side break electrical switch comprising a base member, an insulator structure supported by said base member for rotary movement, a switch blade supported by said rotary insulator structure for movement therewith in a horizontal plane, a second insulator structure fixedly supported by said base member, a contact structure supported by said fixed insulator structure, said contact structure including a head, spaced contact elements extended from said head, a shaft extended from said head, a bearing for supporting said shaft in a horizontal position for oscillatory movement, spaced contact elements electrically contacting with a portion of said shaft, each of said spaced contact elements being comprised of a pair of resilient plates, means for electrically connecting an incoming electrical conductor to said switch blade, and means for electrically connecting an outgoing electrical conductor to the spaced contact elements which contact with said shaft, said spaced contact elements which extend from said head receiving therebetween and in contact therewith a portion of said switch blade.]

[8. A side break electrical switch comprising a base member, an insulator structure supported by said base member for rotary movement, a switch blade supported by said rotary insulator structure for movement therewith in a horizontal plane, a second insulator structure fixedly supported by said base member, a contact structure supported by said fixed insulator structure, said contact structure including a head, spaced contact elements extended from said head, a shaft extended from said head, a bearing for supporting said shaft in a horizontal position for oscillatory movement, spaced contact elements electrically contacting with a portion of said shaft, each of said spaced contact elements being comprised of a pair of resilient plates, one of which is provided with a projection which contacts with the other of said pair of plates, means for electrically connecting an incoming electrical conductor to said switch blade, and means for electrically connecting an outgoing electrical conductor to the spaced contact elements which contact with said shaft, said spaced contact elements which extend from said head receiving therebetween and in contact therewith a portion of said switch blade.]

*9. In a side break electrical switch having a base, a rotary insulator assembly carrying a switch blade, and a second insulator assembly carrying contact means cooperable with the free end of the switch blade; the improvement comprising a spindle fixed to project axially from said rotary insulator, a terminal member rotatably journalled over said spindle, said terminal member being formed in part with a radial line-connecting projection and in part with a cylindric surface concentric with the spindle and axially offset from said line-connecting projection, a blade-holding member fixed on said rotary insulator for carrying the switch blade, said blade-holding member having resiliently-biased brush means engaging the periphery of the cylindric terminal portion, and a hood member mounted over said spindle to cover the cylindric portion of the terminal member and said brush means.*

*10. In a side break electrical switch having a base, a rotary insulator assembly carrying a switch blade, and a second insulator assembly carrying contact means with the free ends of the switch blade; the improvement comprising a terminal member rotatably journalled on one end of said rotary insulator for rotation about the axis thereof, said terminal member being formed in part with a radial line-connecting projection and in part with a cylindric surface axially offset from said line-connecting projection, a blade-holding member fixed to said rotary insulator for carrying the switch blade, a resilient contact leaf fixed to said blade-holding member with its free end engaging the cylindric surface of said terminal member.*

*11. Apparatus as set forth in claim 10, further including a second resilient finger fixed to said blade-holding member and formed with a projection at its free end, said projection engaging the back of said contact leaf adjacent the free end thereof.*

*12. In a side break electric switch having a base, a rotary insulator assembly carrying a switch blade, and a second insulator assembly carrying contact means cooperable with the free end of the switch blade; the improvement comprising contact-supporting means on said second insulator, a contact member having spaced contacts depending therefrom for receiving the free end of the switch blade therebetween, said contact member being journalled on its supporting structure for rotation about a horizontal axis.*

*13. A side break switch as set forth in claim 12, wherein the free end portion of the switch blade is formed with a flattened generally horizontal end, and a lip formed on the upper portion of said flat end for cooperation with one of the spaced contact members as the switch is opened, thereby to swing the contact members from a vertical switch-closed position outwardly to a switch-open position clear of the horizontal flat end of said switch blade.*

*14. A side break switch as set forth in claim 12, wherein said contact members are movable from a vertical switch-closed position outwardly to a switch-open position, and spring detent means on said second insulator for releasably holding the contact members in their outwardly-swung switch-open position.*

References Cited in the file of this patent or the original patent

UNITED STATES PATENTS

| | | |
|---|---|---|
| 2,211,161 | Ramsey | Aug. 13, 1940 |
| 2,227,925 | Cornell et al. | Jan. 7, 1941 |
| 2,306,117 | Dunlap | Dec. 22, 1942 |
| 2,567,606 | Kojis | Sept. 11, 1951 |
| 2,660,631 | Harrison | Nov. 24, 1953 |